US008141035B2

(12) United States Patent
Kinder et al.

(10) Patent No.: US 8,141,035 B2
(45) Date of Patent: Mar. 20, 2012

(54) METHOD FOR ACCESSING INTERNAL STATES OF OBJECTS IN OBJECT ORIENTED PROGRAMMING

(75) Inventors: Stephen Joseph Kinder, Poughkeepsie, NY (US); James Irwin Knutson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1654 days.

(21) Appl. No.: 11/428,593

(22) Filed: Jul. 5, 2006

(65) Prior Publication Data
US 2008/0022260 A1  Jan. 24, 2008

(51) Int. Cl.
*G06F 9/44* (2006.01)
(52) U.S. Cl. .......................... 717/108; 717/106; 717/116
(58) Field of Classification Search .................. 717/108, 717/106, 116
See application file for complete search history.

(56) References Cited

U.S. PATENT DOCUMENTS

| | | | |
|---|---|---|---|
| 6,804,682 B1 * | 10/2004 | Kemper et al. ........................ 1/1 |
| 7,055,147 B2 * | 5/2006 | Iterum et al. .................. 717/170 |
| 7,451,433 B2 * | 11/2008 | Halpern ......................... 717/106 |
| 2004/0049766 A1 * | 3/2004 | Bloch et al. .................... 717/121 |
| 2004/0111701 A1 * | 6/2004 | Beust ............................ 717/108 |
| 2005/0216885 A1 * | 9/2005 | Ireland ......................... 717/108 |

OTHER PUBLICATIONS

Holub (Why getter and setter methods are evil, JAVAworld, Sep. 2003, url:http://www.javaworld.com/javaworld/jw-09-2003/jw-0905-toolbox.html).*
Hunt (Encapsulating Fields, aka generating Getters/Setters, Dec. 2005, url:http://blogs.sun.com/charliebrown/entry/encapsulating_fields_aka_generating_getters).*
Hunt (Of Java Annotations Drawbacks and drawfronts, Feb. 2006, url:http://www.theregister.co.uk/2006/02/24/java_annotations/).*
Frederickson (Object Mapping with Java Annotations, Master Thesis, Montana State University, Apr. 2005).*
Patrikbeno (web article: Simplify Javabean creation: providing default get/set equals and hashcode, Oct. 2004, retrieved Feb. 3, 2011;URL: http://forums.java.net/node/643675).*

* cited by examiner

*Primary Examiner* — Li Zhen
*Assistant Examiner* — Hang Pan
(74) *Attorney, Agent, or Firm* — Yee & Associates, P.C.; David A. Mims, Jr.

(57) ABSTRACT

A method provides an annotated language extension for the class of an object, the extension identifying an internal state that may be exposed via simple accessor methods. The extension could apply to an entire object type, or to a specific state within the object. Annotations that can be added to the extension include @Accessable, @Gettable and @Settable. In one embodiment, a method selectively accesses one or more object states. The method includes generating an annotated extension identifying each internal object state to be exposed for access, adding a usage annotation to the extension that defines an accessor method associated with each identified state, and operating a virtual machine to call the accessor method associated with a particular identified state. The particular state may then be accessed, as defined by the called accessor method.

16 Claims, 6 Drawing Sheets

METHOD FOR ACCESSING INTERNAL STATES OF OBJECTS IN OBJECT ORIENTED PROGRAMMING

BACKGROUND OF THE INVENTION

1. Field of the Invention

The invention disclosed and claimed herein generally pertains to an efficient process or method for accessing internal states of an object, in an object oriented programming paradigm. More particularly, the invention pertains to a method of the above type that can substantially reduce the development effort needed to access encapsulated internal states of an object. Even more particularly, the invention pertains to a method of the above type wherein different types of accessor methods can be applied to different states within the same object.

2. Description of the Related Art

Many programming language compilers, and certainly those used in object oriented programming, tend to be quite literal in their syntax. Object oriented programming provides a number of characteristics that are utilized by developers, including encapsulation, manipulation of state and inheritance. An object interface defines operations and methods that may be performed on an object, and extensions such as inheritance enable an object to support operations that are defined by more than one interface. However, all of the operations of an object tend to be quite literal in their use. If an operation or method is not defined by the object, it cannot be called, and compilers will fail if an attempt is made to use operations or methods that don't exist on the object or object interface.

Because of the need for literal definitions, the definitions of objects in object oriented programming tend to be quite wordy or verbose. This places a significant burden on a software code developer who is writing code to provide access to the internal state of an object, particularly if the state is encapsulated. Encapsulation is a type of privacy applied to the data and to some of the methods in a class, to ensure that an object can be changed only through established channels. The burden on the developer may be substantial even when the state is comparatively simple.

Moreover, as is known by those of skill in the art, after the developer has written object oriented programming code, the code must be parsed by a compiler and rendered into object byte code, so that class files can be prepared therefrom. Finally, the class files are executed by a virtual machine (VM) and interpreted thereby. Thus, a great deal of effort can be required, first for writing code and then for extensively processing it, just to gain access to one or more internal states of an object.

At present, it is common to write accessor methods that expose the internal state as a property whose value can be obtained or changed by invoking one of such methods. Accessor methods can be getters, setters or both getters and setters, as further defined hereinafter. These methods are often boilerplate and provide little value. However, the developer is still forced to write them, since they are necessary for encapsulation. In the past, one of the ways that boilerplate code has been addressed is through macro code. This allows boilerplate code to be processed at compilation time. However, macro code maintenance has its own set of problems, particularly in determining what parts of the code need to be compiled when macros are changed or require debugging. Macros are generated inline, and therefore the expanded code must be syntactically proper for the macro generation. Macros also cause code to be generated in every use case, which can cause code bloat that developers aren't aware of.

In view of the current state of the art, it would be beneficial to provide a simpler and more efficient process for exposing or allowing access to internal states of objects, and to data values associated therewith.

SUMMARY OF THE INVENTION

Embodiments of the invention are directed to an annotated language extension for the class of an object used in object oriented programming, wherein the extension identifies an internal state that may be exposed via simple accessor methods. The annotations may apply to an entire object type, that is, to all states contained by the object, or to a specific state within the object. Three types of annotations that may be added to the extension include @Accessable (defines the state as having both getters and setters); @Gettable (defines the state as having a getter only); and @Settable (defines the state as having a setter only). Annotations may include visibility modifier attributes, such as @Gettable (scope="protected"). The annotations defined on a specific state may include attributes which define the external name for the state, such as @Gettable(propertyName="someState"). One embodiment of the invention is directed to a set of processes that include adding annotated metadata to the class definition; associating the annotated metadata with the executable code created during compilation; developing code that uses the executable classes that have metadata associated with them; and the compilation/runtime process for the usage patterns. Other embodiments can include methods, apparatus and computer program products. A further embodiment provides a method that comprises preparing an object class having one or more encapsulated internal states; generating an annotation extension for the class that identifies each internal state of the object that is to be exposed for access, wherein the annotation extension defines an accessor method associated with each of the identified internal states; operating a virtual machine (VM) to call the accessor method associated with a particular one of the identified internal states; and accessing the particular internal state as defined by the called accessor method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
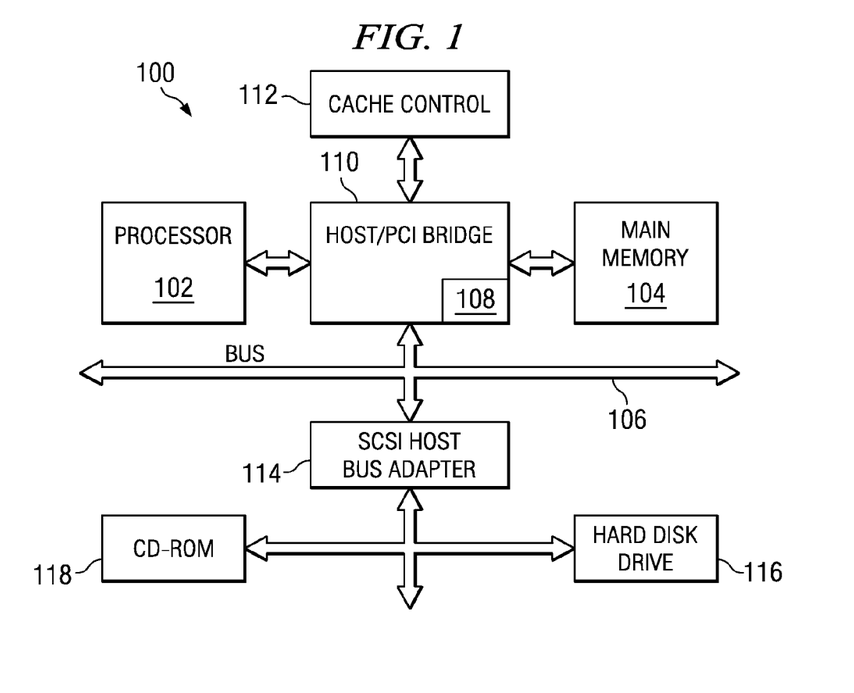
FIG. 1 is a block diagram showing a generalized computer or data processing system that can be used in implementing an embodiment of the invention.

Referring to FIG. 1, there is shown a block diagram of a generalized data processing system 100 which may be used in implementing embodiments of the present invention. Data processing system 100 exemplifies a computer, in which code or instructions for implementing the processes of the present invention may be located. Data processing system 100 usefully employs a peripheral component interconnect (PCI) local bus architecture, although other bus architectures may alternatively be used. FIG. 1 shows a processor 102 and main memory 104 connected to a PCI local bus 106 through a Host/PCI bridge 110. PCI bridge 110 also includes a cache memory 108 for processor 102 and a cache control 112.

FIG. 1 further shows a small computer system interface (SCSI) host bus adapter 114 connected to PCI local bus 106 by direct component connection. SCSI host bus adapter 114 provides a connection for hard disk drive 116, and also for CD-ROM drive 118. An operating system runs on processor 102 and is used to coordinate and provide control of various components within data processing system 100 shown in FIG. 1. The operating system may be a commercially available operating system such as Windows XP, which is available from Microsoft Corporation. Instructions for the operating system and for applications or programs are located on storage devices, such as hard disk drive 116, and may be loaded into main memory 104 for execution by processor 102.

Figure 2:
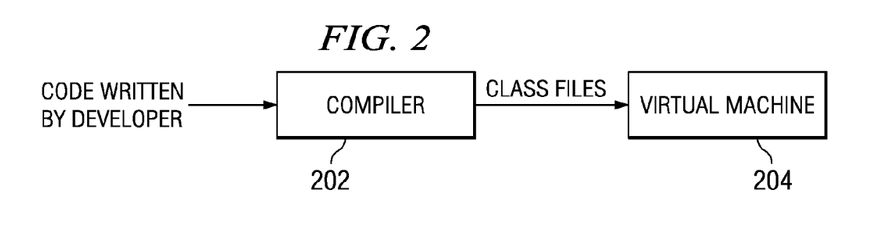
FIG. 2 is a schematic diagram illustrating components for generating an annotated extension in accordance with an embodiment of the invention.

Referring to FIG. 2, there is shown a compiler 202 and a virtual machine 204, such as a Java virtual machine. These components are respectively operated to provide an annotation extension for a class associated with an object oriented program, in accordance with an embodiment of the invention. Compiler 202 and virtual machine 204 may be implemented on a computer system exemplified by data processing system 100, but the invention is by no means limited thereto.

After code has been written or created by a developer, such as code for an annotated extension according to the invention, the code is delivered to compiler 202. The compiler parses the written code into object code such as byte codes, and then prepares one or more class files that contain the byte code. The class files are then sent to virtual machine 204. The virtual machine interprets the class files, and runs methods or other operations defined in the class files.

In object oriented programming, the objects of a class typically have states that comprise data members, and are thus associated with stored data. Frequently, the state of an object must be accessed or exposed for some reason. For example, it may be necessary to insert, or set, a particular value into the data member of the state. Alternatively, it may be necessary to acquire, or to get, a particular value from the state data member. Accordingly, the term "setter" as used herein means an accessory method definition or other operation for exposing or accessing the data member of a state, in order to insert data thereinto. In like manner, the term "getter" as used herein means an accessory method definition or other operation for accessing a data member of a state to acquire data therefrom. For convenience, the terms "state" and "data member", which are closely related, may be used interchangeably herein.

An embodiment of the invention provides an annotation extension for a class of objects, wherein the annotation extension has two principal components. These are (1) an identification of internal states to which the annotation extension applies, and (2) annotation usage. Usefully, the extension is in the Java language, but the invention is not limited thereto. The accessable annotations for the embodiment respectively comprise @Accessable; @Gettable; and @Settable. @Accessable defines the state to have both getters and setters, as such terms are respectively defined above. @Gettable defines the state to have a getter, and @Settable defines the state to have a setter. It will be understood that other annotation names could alternatively be chosen that respectively had the same functional intentions.

Several examples of annotation extensions of the above type are set forth and discussed hereinafter. These examples are referred to as Annotation Examples A, B, and C, respectively.

Annotation Example A

```
@Accessable
public class Customer{
    private int customerNumber=0;
    private String customerName;
    private String customerAddress;
}
```

Annotation Example A has the annotation usage @Accessable, and defines such usage at the class level. More specifically, the defined usage pertains to the entire state of class Customer. Moreover, this class includes the three elements within the brackets, that is, private integer customerNumber, private String customerName, and private String customerAddress. These elements respectively identify three internal states of objects of the class Customer. However, since the annotation @Accessable is applied to the entire class or object type, all the states contained in objects of the class are exposed by the accessory methods defined by @Accessable. Since this annotation defines a state to be accessible to both getter and setter methods, Annotation Example A effectively specifies six access methods. More particularly, Annotation Example A defines data members of each of the three states of the class Customer to be accessible by both getter and setter methods. Defining accessable annotations at the class level is not limited to @Accessable. It also applies to @Gettable and @Settable, though in this case only three access methods would be defined; that being 3 getters or 3 setters respectively. Given the above, it is therefore illegal to multiply define an accessor method using an annotation and method definition. For example, the following class definition would fail to compile because the method getCNum is effectively defined two times:

```
public class Illegal {
    @Gettable
    private int cNum;
    // fails compilation because getCNum( ) is multiply defined
    public int getCNum( ) { return 2; }
}
```

Annotation Example B

```
public class Person {
    @Gettable(propertyName="id",
scope="protected")
    private String __SSID;
    ...
}
```

Annotation Example B shows the annotation @Gettable applied to a specific state of an object of the class Person. More specifically, the @Gettable annotation is applied to expose the data member String _SSID of such state. Annotation Example B illustrates that while the data member is exposed by a getter method, it remains protected from public access and is not exposed at all through a setter method. By default, accessable annotations expose state using a public visibility scope and using an external name that is the same as the internal state name. Annotation Example B also illustrates that the name used to externally reference the state can be changed, such as to "id", and that the visibility scope may be changed to something other than public, such as "protected". Defining accessable annotations at the data member level is not limited to @Gettable. Both @Accessable and @Settable may be used at the data member level. Usage of the propertyName attribute is limited in use only to defining accessable annotations (any of the 3 annotations) for data members. This attribute may not be used at the class level as this would cause conflicts with multiple data members using the same external name. Usage of the scope attribute may occur at both the class and data member level.

Annotation Example C

```
public class Manager {
    @Gettable
    private int managerNumber=0;
    private String customerName;
    @Accessable
    private String customerAddress;
    ...
}
```

Annotation Example C shows the class Manager, wherein objects of the class have states with the data members private integer managerNumber, private String customerName and private String customerAddress. Annotation Example C illustrates an annotation extension according to an embodiment of the invention that can apply differently to the data members of different states within the class. Thus, some of the data members can have one type of exposure and other data members can have another type. More particularly, the data member private int managerNumber is only Gettable, the data member private String customerName remains private, while the data member private String customerAddress is both Gettable and Settable.

In order to illustrate use of Annotation Example A in an embodiment of the invention, the following statement is to be considered, as Usage Example 1. The statement is set forth in normal Java syntax, although the invention is not limited thereto.

Usage Example 1

```
Customer c=new Customer( );
c.setCustomerNumber(1000);
System.out.println("Customer number is", c.getCustomerNumber( ));
```

Figure 3:
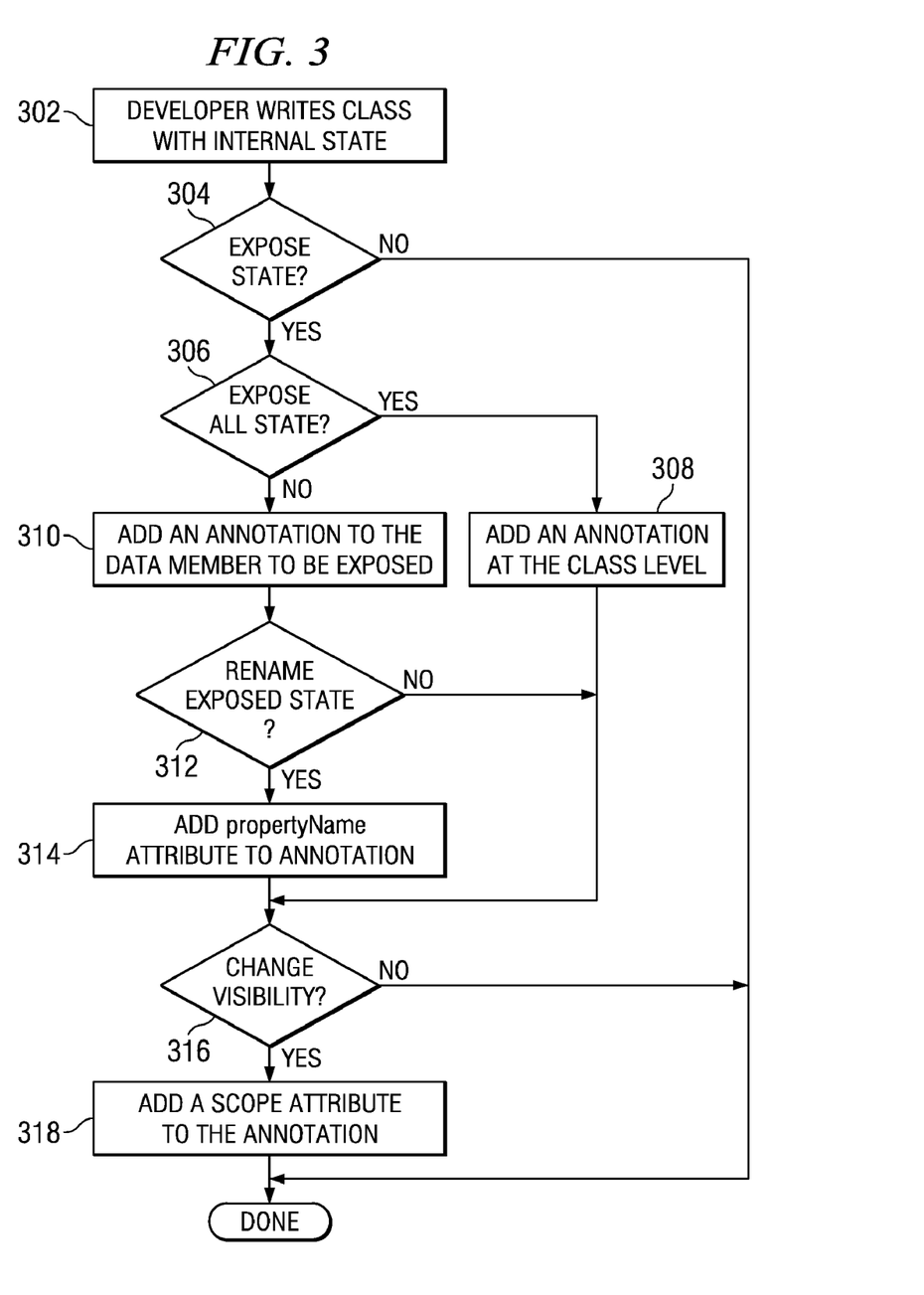
FIG. 3 is a flow chart showing steps taken in exposing state using accessable annotations.

The first line of Usage Example 1 states that a variable c refers to a new instance that is a type of the class Customer. On the second line, the statement c.setCustomerNumber is a method identification on the type Customer. This statement is intended to call this method on the object instance referenced by the variable c, in order to set the data member of the internal state customerNumber to a value of 1000. When the virtual machine calls c.setCustomerNumber as a method, the virtual machine fails to recognize this as a method that is public for the class Customer. However, in accordance with the embodiment of the invention, the virtual machine will notice the annotation @Accessable added to the class Customer, as described above in connection with Annotation Example 1. This enables the virtual machine to recognize that all the internal states of the class Customer are exposed, including the state customerNumber, for both getting and setting. Thereupon, the called method setCustomerNumber will be recognized as the standard pattern for a setter method and will be converted into a direct access of the state customerNumber. This could be said to be similar to method inlining, where a method call is replaced by the equivalent code of the method. In this case, the equivalent code would be to temporarily make customerNumber publicly visible long enough to execute: c.customerNumber=1000; This state is then set to value 1000. However, method inlining fixes the code to execute at compilation time and therefore does not work for polymorphic use cases where an inheritance subtype may be substituted at runtime. A similar sequence of events occurs in line 3 of Usage Example 1. The virtual machine attempts to call method getCustomerNumber on the Customer object instance referenced by variable c. The virtual machine recognizes that the getCustomerNumber method is not defined, but does notice that the state of the entire class is Accessable. Thereupon, the called method getCustomerNumber will be recognized as the standard pattern for a getter method and will be converted into a direct access of the state customerNumber. The equivalent code in this case would be to temporarily make the customerNumber data member publicly visible long enough to execute: System.out.println("Customer number is", c.customerNumber);

Referring to FIG. 3, there are shown steps taken by a developer in writing a normal Java class with internal state, as indicated by step 302. Upon deciding that internal state should be exposed, the developer first decides whether to expose the entire state or some of it, as shown by steps 304 and 306 (with more control given by exposing individual state). Exposing all state is generally done by the developer adding an annotation to the class definition, as shown in Annotation Example A and step 308. Exposing selected state is done by annotating an individual data member as shown in Annotation Example B, by step 310. If the internal state name needs to be changed to a different external state name, the developer adds a propertyName attribute to the annotation specifying the external name to use. This is shown by Annotation Example B and steps 312 and 314. If the default visibility of public is not correct, then the visibility scope can be changed by the developer adding the scope attribute to the annotation, as indicated by Annotation Example B and steps 316 and 318.

Inheritance is an important mechanism in object oriented programming that allows creation of classes having both internal state and behavior, and can be used to enhance and override parent state and behavior. When a subtype is created using inheritance, the behavior and data of all the states of the base class is retained or inherited into the subtype. An inheritance example, derived from Annotation Example B, is the following:

Annotation Example D

```
public class Employee extends Person{
    //override parent accessors
    @Accessable(propertyName="id")
    private String empId;
    //accessors for parent state
    public String getSSN( ){return super.getId( );}
    public void setSSN(String s){super.setId(s);}
}
```

Usage Example 2

```
public boolean validatePerson(Person p) {
    //access _SSID data member via externalized
    //property name
    return p.getId( ).length( )>0;
}
...
```

The above statement, for Usage Example 2, pertains to an embodiment of the invention that uses Annotation Example D. The above statement is generally directed to a method for validating an object of the class Person, by expressing that the length of the id property is greater than 0. When the method validatePerson is called with an instance of a Person object, the getId method is called on it and the virtual machine finds that there is no such method on the class Person. However, the virtual machine will discover that for the class Person, Annotation Example B has exposed the data member String _SSID to be Gettable, with the name id. Thus, the virtual machine will return the data member value of _SSID, as the value for id. This value can then be used in Usage Example 2, to validate that the id property length is greater than 0. When the method validatePerson is called with an instance of an Employee object, the getId method is called on it and the virtual machine finds that there is no such method on the class Employee. However, the virtual machine will discover that for the class Employee, Annotation Example D has exposed the data member String empId to be Accessable, with the name id. Thus, the virtual machine will return the data member value of empId, as the value for id. This value can then be used in Usage Example 2, to validate that the id property length is greater than 0.

Figure 4:
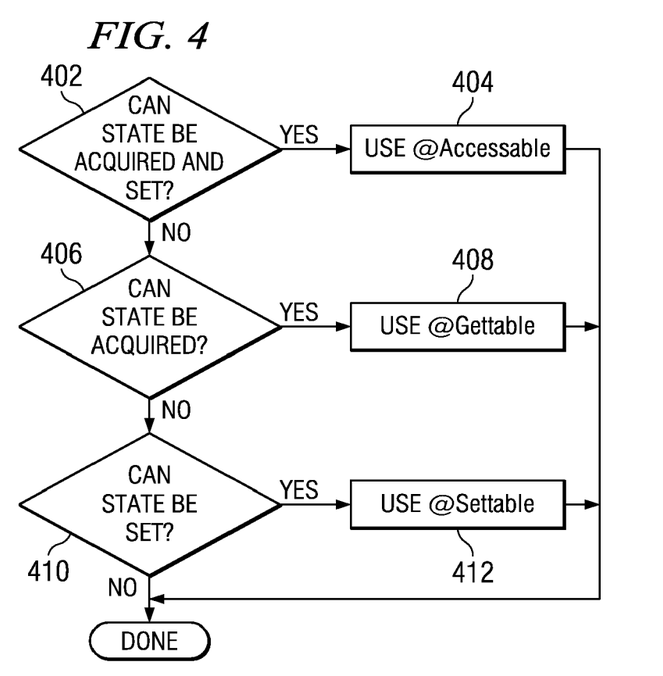
FIG. 4 is a flow chart showing expanded steps of the "Add an annotation" step in FIG. 3.

Referring to FIG. 4, the flow chart thereof shows the selection criteria a developer goes through in deciding which annotation to use when adding an accessable annotation to code, such as step 308 or 310 of FIG. 3. If state can be both acquired and set, then the @Accessable annotation is used, as shown by steps 402 and 404. If state can only be acquired, then @Gettable is used, as shown by steps 406 and 408. If state can only be set, then @Settable is used, as shown by steps 410 and 412.

Figure 5:
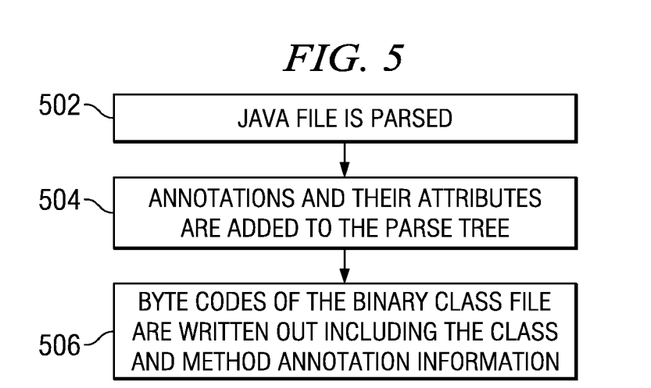
FIG. 5 is a flow chart showing the steps a compiler takes in compiling a class that exposes state using accessable annotations.

Referring to FIG. 5, there are shown steps of a process used by a compiler in compiling code that contains accessable annotations. There are at least two ways to do this. A useful embodiment, which produces the least amount of byte codes and therefore reduces class file/download sizes, is to parse the Java file, as indicated by step 502. The annotations, including their attribute information is added to the parse tree at step 504.

In accordance with step 506, the byte codes are written out. Once the byte codes are written out to the class file, the annotations are persisted with them. Note the annotations will need to be persisted in such a way that the runtime may look at them as well. In Java parlance, it is said to have a RUNTIME retention policy. All the various tools associated with the language will need to be modified as well. For example, documentation generators, such as javadoc, will need to emit annotated fields as if they were accessor method definitions. Byte code scanners/decompilers, such as javap, will need to display the annotations in the class files as if they were accessor method definitions. Another option is to emit the actual accessor method definitions at compile time as they would be defined by the annotations. In this case, the behavior is much more closely aligned with macros, except that the generated accessor methods are appropriately placed as part of the class definition and are not generated in place like a macro would typically work. The generated code equivalent of Annotation Example A occurring in this case, for example, is:

```
// @Accessable
public class Customer{
    private int customerNumber;
    // generated getter
    public int getCustomerNumber( ) {
        return customerNumber; }
    // generated setter
    public void setCustomerNumber(int param) {
        customerNumer=param; }
    private String customerName=NULL;
    // generated getter
    public String getCustomerName( ) {
        return customerName; }
    // generated setter
    public void setCustomerName(String param) {
        customerName=param; }
    private String customerAddress=NULL;
    // generated getter
    public String getCustomerAddress( ) {
        return customerAddress; }
    // generated setter
    public void setCustomerAddress(String p) {
        customerAddress = p; }
}
The generated code equivalent of Annotation Example
B is:
    public class Person {
        // @Gettable(propertyName="Id",
    scope="protected")
        private String _SSID;
        protected String getId( ) {
            return _SSID; }
        ....
    }
```

This generates more byte codes for the compiled class files, but simplifies the tools and runtime so that most tools and runtime do not need to understand the annotations. Only the javadoc documentation generation tool would need to emit accessor method documentation based on the source code (in addition to the compiler/annotation processor understanding the annotations during compilation). In this case, step 506 would generate and compile the methods described above and the flow charts of FIGS. 6, 7, and 8 are not needed because the accessor methods would always exist once the class is compiled.

Figure 6:
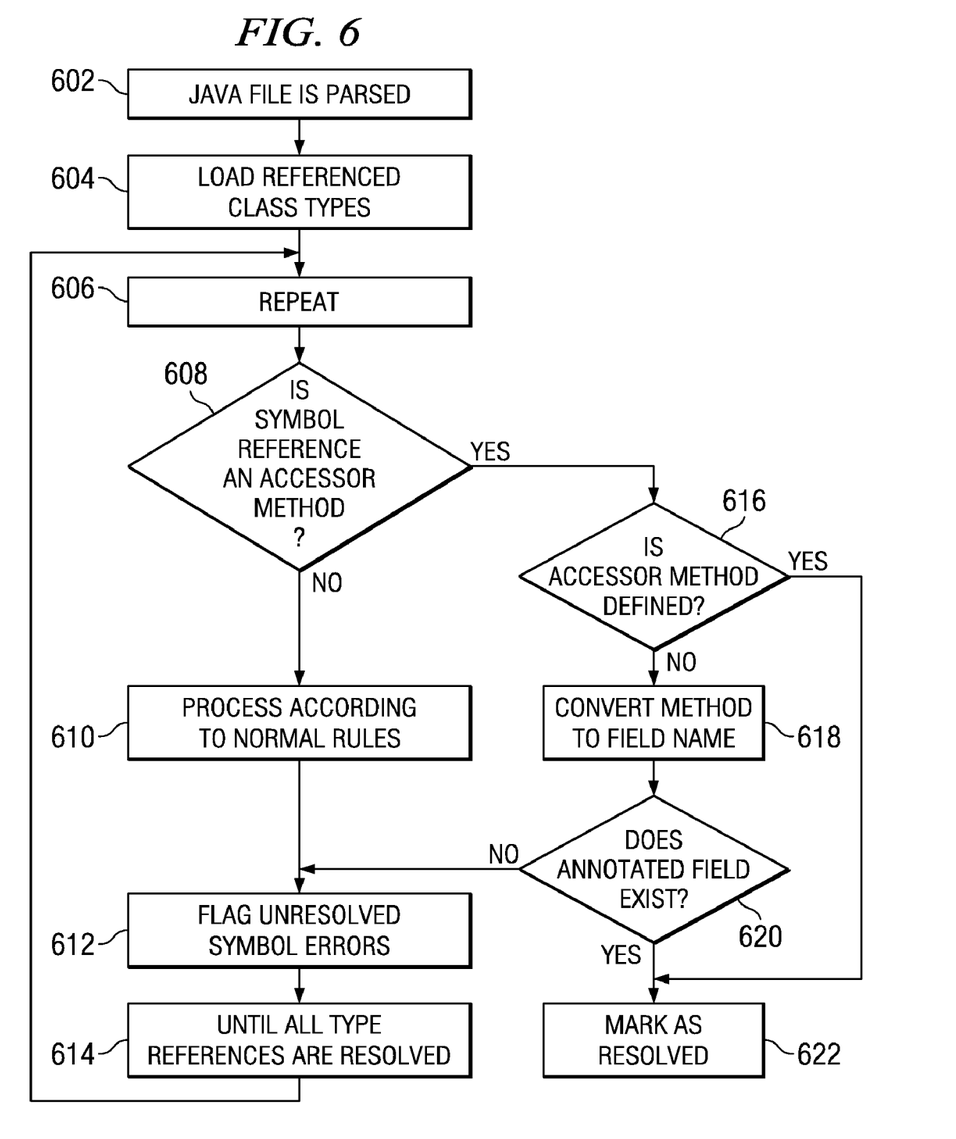
FIG. 6 is a flow chart showing the steps a compiler takes in accessing state of a class with state exposed by annotations.

FIG. 6 shows a flow chart for compiling code that uses state exposed by annotations. It should be noted that this is only necessary if the process described by FIG. 5 does not generate/emit the actual accessor method definitions. As an example, this would refer to compiling Usage Example 1 code. The flow chart describes an extension to compiler logic for processing method invocations. As the Java file is parsed at step 602, symbol references are made to other types (e.g. c.setCustomerNumber). At step 604, the referenced type (Customer) is loaded to check for the existence of the symbol reference (setCustomerNumber). If the reference matches an accessor method pattern (e.g. set<propertyName>(Type arg)) and the method exists, then the compiler proceeds as it normally does, as shown by steps 608, 616 and 622. If the symbol reference is an accessor method pattern and doesn't exist, then at step 618 the accessor method is converted to a field name. This is done by stripping the preceeding "get" or "set" (note: Boolean types use a prefix of "is" for a getter) from the method name and converting the first character of the remaining string to lower case (setCustomerName becomes customerName). This is checked against the existence of fields that have been exposed appropriately, as shown at step 620. For a getter method, the field must be exposed as @Accessable or @Gettable. For a setter method, the field must be exposed as @Accessable or @Settable. The field name check must also take into account the existence of the propertyName attribute value and match against that, if specified. If an appropriate field exists, the compilation can proceed as a normal resolved symbol reference. If not, then the symbol is flagged as an unresolved symbol error, as indicated by step 612. Steps 606, 610 and 614 indicate that the process continues until all symbol references are resolved.

A method invocation completes normally if that invocation does not cause an exception to be thrown, either directly from the Java virtual machine or as a result of executing an explicit throw statement. If the invocation of the current method completes normally, then a value may be returned to the invoking method. This occurs when the invoked method executes one of the return instructions, the choice of which must be appropriate for the type of the value being returned (if any). The current frame is used in this case to restore the state of the invoker, including its local variables and operand stack, with the program counter of the invoker appropriately incremented to skip past the method invocation instruction. Execution then continues normally in the invoking method's frame with the returned value (if any) pushed onto the operand stack of that frame.

Figure 7:
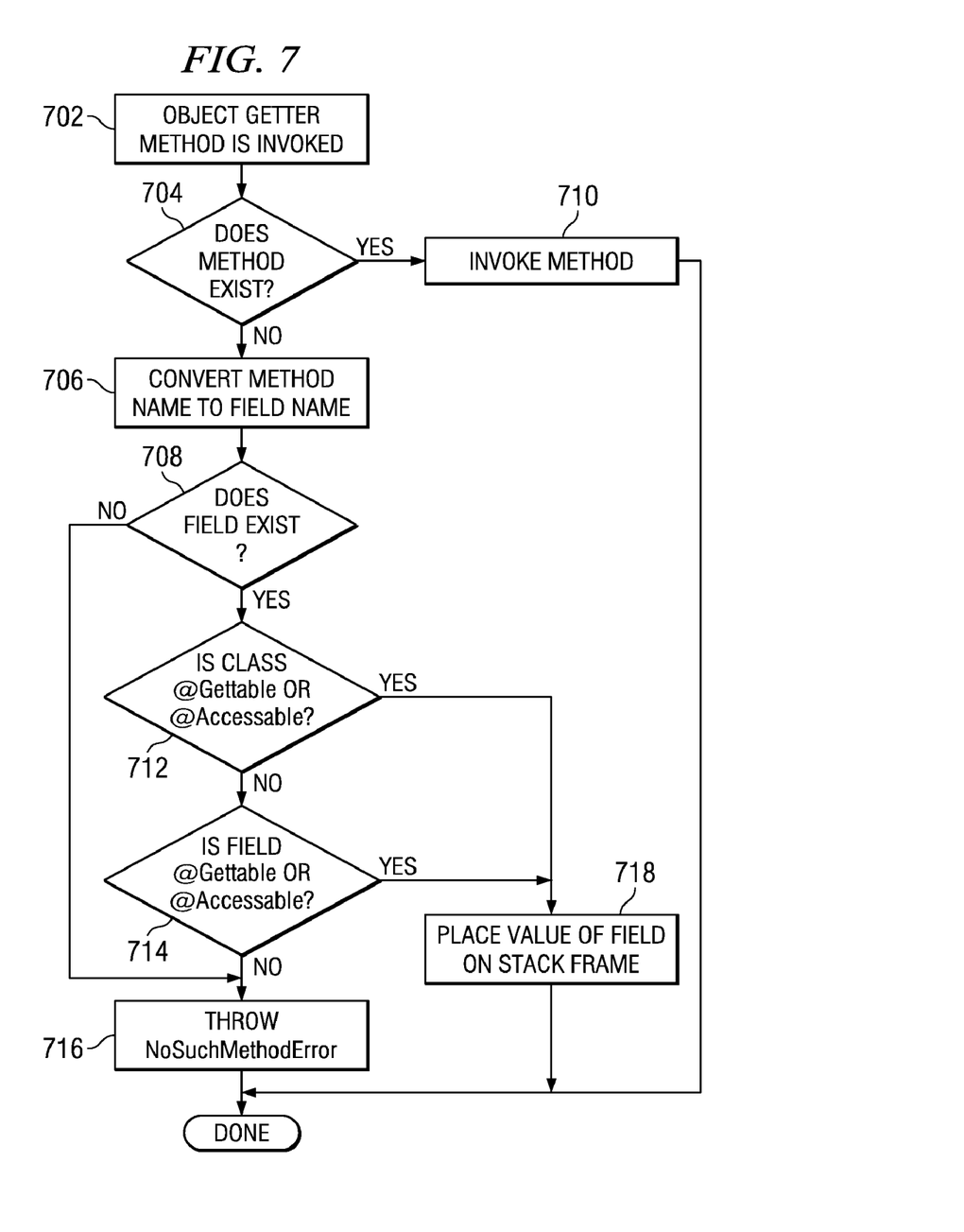
FIG. 7 is a flow chart showing steps of runtime behavior for getting exposed state.

FIG. 7 depicts a flow chart showing the runtime process for getting state exposed by accessable annotations. This is only necessary if the process of FIG. 5 does not emit/generate actual getter method definitions. When a getter method invocation occurs (e.g. c.getCustomerNumer( )), as at step 702, a check is made on the object type the getter method is being invoked on (e.g. Customer). As shown by steps 704 and 710, if the method definition exists, execution proceeds normally. If the method definition does not exist, the getter method name is converted to a field name, at step 706, by removing the "get" prefix (or "is" for Boolean types) and converting the first character of the remaining string to lower case (e.g. getCustomerName becomes customerName). As indicated by steps 708, 712 and 714, the type is checked for the existence of an @Accessable or @Gettable annotated field by that name, or with a propertyName attribute of that value. If none exist, a NoSuchMethodError is thrown, at step 716. Otherwise, the value of the field is placed on the stack frame, at step 718, to act as the return value of the method invocation.

Figure 8:
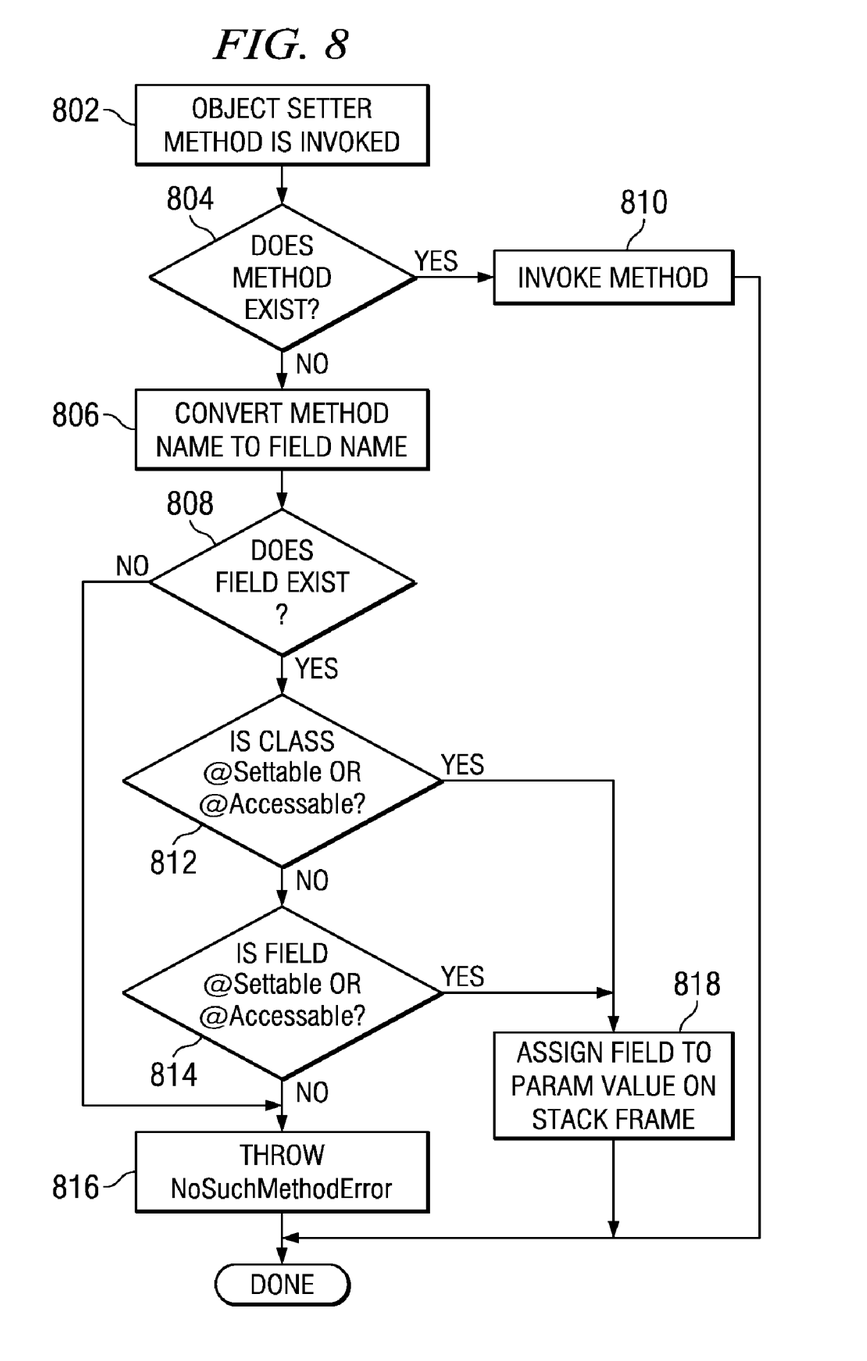
FIG. 8 is a flow chart showing steps of runtime behavior for setting exposed state.

FIG. 8 depicts a flow chart describing the runtime process for setting state exposed by accessable annotations. This is only necessary if the process of FIG. 4 does not emit/generate actual setter method definitions. When a setter method invocation occurs (e.g. c.setCustomerNumber(1000), as at step 802, a check is made on the object type the setter method is being invoked on (Customer). As shown by steps 804 and 810, if the method exists, execution proceeds normally. If the method does not exist, the setter method name is converted to a field name by removing the "set" prefix and converting the first character of the remaining string to lower case (e.g. setCustomerName becomes customerName). As indicated by steps 808, 812 and 814, the type is checked for the existence of an @Accessable or @Settable annotated field by that name or with a propertyName attribute of that value. If none exists, a NoSuchMethodError is thrown, at step 816. Otherwise, the value of the field is set to the value of the parameter on the stack frame. For example, c.setCustomerNumber(1000) would place the value 1000 on the stack frame as a parameter, as shown by step 818. The method would not exist on the type referred to by variable c, therefore a check for an annotated field by the name of customerNumber would be made. The parameter value of 1000 would be assigned to the customerNumber field.

The above algorithms represent a useful embodiment of implementing the invention. Many optimizations may exist that are particular to a compiler implementation or language use case.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In an object oriented programming paradigm, a method comprising the steps of:
   preparing an object class having multiple encapsulated internal states;
   generating an annotation extension for said class that identifies each internal state of an object that is to be exposed for access, wherein said annotation extension defines one or more accessor methods associated with each of said identified internal states, wherein said annotation extension is located outside of said object class, wherein a usage annotation specifies different accessor methods for different identified internal states of the same object;
   operating a virtual machine (VM) to call the accessor method associated with a particular one of said identified internal states; and
   accessing said particular internal state as defined by the called accessor method.

2. The method of claim 1, wherein:
   said class contains multiple internal states, and said annotation extension is applied to one or more specified states within said object.

3. The method of claim 2, wherein:
   said annotation extension includes at least one attribute that defines an external name for one of said specified states within said object.

4. The method of claim 1, wherein:
   said usage annotation defines at least one accessor method that is selected from a group including Gettable only, Settable only, and both Gettable and Settable accessor methods.

5. The method of claim 1, wherein:
   said annotation extension defines a name, in order to override a default condition.

6. The method of claim 1, wherein:
   said annotation extension includes a visibility modifier.

7. The method of claim 1, wherein:
   said annotation extension is recognized as a getter method by the VM associated with said object.

8. The method of claim 1, wherein:
   said annotation extension is recognized as a setter method by the VM associated with said object.

9. In an object oriented programming paradigm, wherein an object of a class has multiple encapsulated internal states, a computer program product comprising a non-transitory computer readable storage medium having program instructions stored thereon for selectively accessing said states comprising:
   first instructions for generating an annotation extension for said class that identifies each internal state of said object that is to be exposed for access, wherein said annotation extension defines one or more accessor methods associated with each of said identified internal states, wherein said annotation extension is located outside of said object class, wherein a usage annotation specifies different accessor methods for different identified internal states of the same object;
   second instructions for operating a virtual machine to call the accessor method associated with a particular one of said identified internal states; and
   third instructions for accessing said particular internal state as defined by the called accessor method.

10. The computer program product of claim 9, wherein:
    said class contains multiple internal states, and said annotation extension is applied to one or more specified states within said object.

11. The computer program product of claim 10, wherein:
    said annotation extension includes at least one attribute that defines an external name for one of said specified states within said object.

12. The computer program product of claim 9, wherein:
    said usage annotation defines at least one accessor method that is selected from a group including Gettable only, Settable only, and both Gettable and Settable accessor methods.

13. In an object oriented programming paradigm, wherein an object of a class has multiple encapsulated internal states, an apparatus for selectively accessing said states comprising:
    a first processor component adapted to generate an annotation extension for said class that identifies each internal state of said object that is to be exposed for access, wherein said annotation extension defines one or more accessor methods associated with each of said identified internal states, wherein said annotation extension is located outside of said object class, wherein a usage annotation specifies different accessor methods for different identified internal states of the same object;
    a virtual machine disposed for operation to call the accessor method associated with a particular one of said identified internal states; and
    a second processor component for accessing said particular internal state as defined by the called accessor method.

14. The apparatus of claim 13, wherein:
    said first processor component applies said annotation extension to one or more specified states within said object.

15. The apparatus of claim 14, wherein:
    said first processor component generates said annotation extension to include at least one attribute that defines an external name for one of said specified states within said object.

16. The apparatus of claim 13, wherein:
    said usage annotation is generated by said first processor component to define at least one accessor method that is selected from a group including Gettable only, Settable only, and both Gettable and Settable accessor methods.

* * * * *